(12) United States Patent
Maier

(10) Patent No.: US 9,127,595 B2
(45) Date of Patent: Sep. 8, 2015

(54) PARALLEL CASCADED CYCLE GAS EXPANDER

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 559 days.

(21) Appl. No.: 13/562,411

(22) Filed: Jul. 31, 2012

(65) Prior Publication Data

US 2014/0190172 A1   Jul. 10, 2014

Related U.S. Application Data

(60) Provisional application No. 61/523,040, filed on Aug. 12, 2011.

(51) Int. Cl.
| F01D 5/02 | (2006.01) |
| F02C 3/04 | (2006.01) |
| F01K 7/02 | (2006.01) |
| F01K 7/16 | (2006.01) |
| F01D 1/02 | (2006.01) |

(52) U.S. Cl.
CPC . *F02C 3/04* (2013.01); *F01D 1/023* (2013.01); *F01K 7/02* (2013.01); *F01K 7/16* (2013.01)

(58) Field of Classification Search
CPC .......... F01D 5/022; F01D 5/023; F01D 1/04; F01D 1/023; F02C 3/04; F01K 7/16; F01K 7/02

USPC ................ 416/77, 154.1, 154.2, 198.1, 199.4
See application file for complete search history.

(56) References Cited

U.S. PATENT DOCUMENTS 5,490,377 A * 2/1996 Janes .......................... 60/39.12

FOREIGN PATENT DOCUMENTS

DE             1002570 B  *  2/1957  .............. F01D 5/022

OTHER PUBLICATIONS

DE1002570B Machine Translation. Accessed EPO website on Feb. 24, 2015.*

* cited by examiner

*Primary Examiner* — Richard Edgar
(74) *Attorney, Agent, or Firm* — Edmonds & Nolte, PC

(57) ABSTRACT

A multi-stage, two-flow, axial flow expander close-coupled to a driven machine, such as a generator. The expander includes one or more expansion stages separated by a series of flow stream dividers that separate each expansion stage into outer and inner expander flowpaths. Working fluid at a first temperature is directed into the outer expander flowpath for expansion, and working fluid at a second, lesser temperature is directed into the inner expander flowpath for expansion. Expansion of the working fluid drives the driven machine.

16 Claims, 3 Drawing Sheets

PARALLEL CASCADED CYCLE GAS EXPANDER

The present application claims priority to U.S. Provisional Patent Application Ser. No. 61/523,040, which was filed Aug. 12, 2011. This priority application is hereby incorporated by reference in its entirety into the present application, to the extent that it is not inconsistent with the present application.

BACKGROUND

Heat engines are used to convert heat or thermal energy into useful mechanical work and are often used in power generation plants. One example of a portion of a heat engine is an expander-generator system which generally includes an expander (e.g., a turbine) rotatably coupled to a generator or other power generating device via a common shaft. As the working fluid expands in the expander, the shaft is forced into rotational movement which excites a flow of electrons in the windings of the generator such that a flow of electrical power ensues. The electrical power may then be harnessed and used as useful work.

Most power plant expander-generators are based on the Rankine cycle and obtain high temperature/pressure working fluids through the combustion of coal, natural gas, oil, and/or nuclear fission. Typical working fluids for Rankine cycles include water (steam) and certain hydrocarbon (organic) fluids. Recently, however, due to perceived benefits in terms of hardware compactness, efficiency, and heat transfer characteristics, there has been considerable interest in using supercritical carbon dioxide ($ScCO_2$) as a working fluid for certain expander-generator applications. Notable among such applications are nuclear, solar, and waste heat energy conversion cycles.

Although $ScCO_2$ has several remarkable advantages as a process fluid, its small ratio of specific heat makes its use in waste heat recovery cycles problematic. The small specific heat value results in a small temperature drop in the $ScCO_2$ gas through a typical heat cycle pressure/expansion process. This relatively small temperature drop can limit the amount of waste heat energy recovery possible with simple Rankine (and Brayton) cycles, especially for applications with waste heat streams of high initial gas temperatures.

One solution to this problem has been to use multiple, separately-cascaded heat cycles that operate with different heat input temperatures in order to handle a larger range of waste heat stream temperatures. This solution, however, requires two or more separate gas expanders that operate over substantially the same pressure ratio, but at differing temperatures. Using plural gas expanders increases operational and capital costs and decreases system reliability since multiple pieces of equipment can potentially fail or cause problems.

What is needed, therefore, is a practical approach to combining two or more expansion processes into a single, compact, and effective turbomachine suitable for such cascaded cycle applications.

SUMMARY

Embodiments of the disclosure may provide an expansion device. The expansion device may include an expander casing having an expander rotor rotatably arranged therein, a first inlet to the expander casing for receiving a first flow of a working fluid at a first temperature, and a second inlet to the expander casing for receiving a second flow of the working fluid at a second temperature, the second temperature being less than the first temperature. The expansion device may also include one or more expansion stages arranged axially along the expander rotor, each expansion stage including a non-rotating stator vane followed axially by a rotating blade, and a series of flow stream dividers extending axially along the one or more expansion stages to divide the one or more expansion stages into an outer expander flowpath and an inner expander flowpath, the outer expander flowpath being radially-offset from the inner expander flowpath. The expansion device may further include an outer inlet manifold fluidly coupled to both the first inlet and the outer expander flowpath such that the outer expander flowpath receives the first flow of the working fluid, and an inner inlet manifold fluidly coupled to both the second inlet and the inner expander flowpath such that the inner expander flowpath receives the second flow of the working fluid.

Embodiments of the disclosure may further provide a method for expanding a working fluid. The method may include introducing a first flow of a working fluid into an expansion device via a first inlet, the first flow being at a first temperature, and introducing a second flow of the working fluid into the expansion device via a second inlet, the second flow being at a second temperature that is lower than the first temperature. The method may also include directing the first flow into an outer expander flowpath defined axially along one or more expansion stages of the expansion device, and directing the second flow into an inner expander flowpath defined axially along the one or more expansion stages, the inner and outer expander flowpaths being radially-separated by a series of flow stream dividers configured to thermally and sealingly isolate the inner expander flowpath from the outer expander flowpath. The method may further include expanding the first and second flows across the one or more expansion stages, and discharging the first and second flows from the expansion device via first and second outlets, respectively.

Embodiments of the disclosure may further provide a rotating machine. The rotating machine may include an expansion device hermetically-sealed within a first casing having an expander rotor arranged therein for rotation. The expansion device may include one or more expansion stages arranged axially along the expander rotor and divided radially into an outer expander flowpath and an inner expander flowpath by a series of flow stream dividers, a first inlet fluidly coupled to the outer expander flowpath to direct a first flow of a working fluid at a first temperature to the outer expander flowpath, and a second inlet fluidly coupled to the inner expander flowpath to direct a second flow of the working fluid at a second temperature to the inner expander flowpath, the second temperature being less than the first temperature. The rotating machine may also include a driven machine hermetically-sealed within a second casing coupled to the first casing, the second casing having a driven machine rotor arranged therein for rotation and coupled to the expander rotor.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
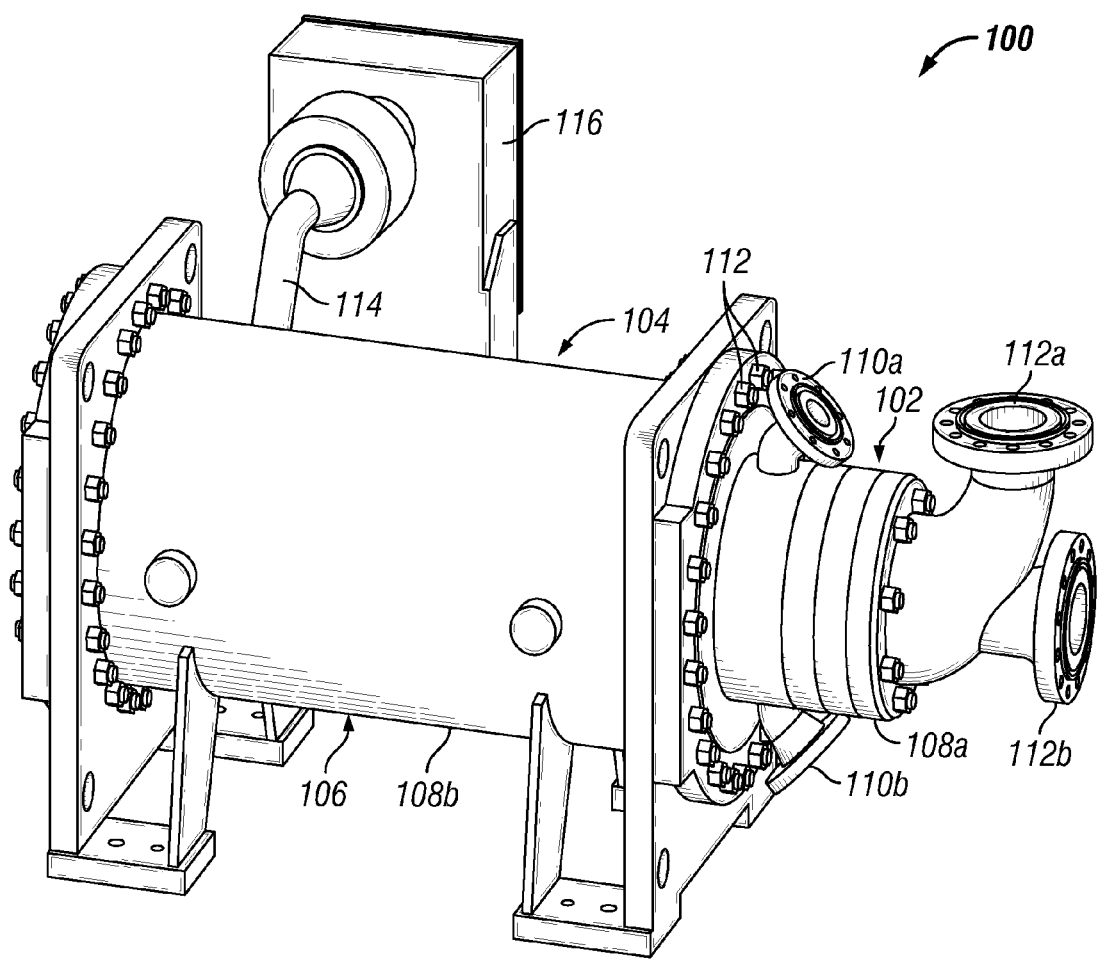
FIG. 1 illustrates a rotating machine, according to one or more exemplary embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary rotating machine 100, according to one or more exemplary embodiments described. In one exemplary embodiment, the rotating machine 100 may be an expander-generator that includes an expansion device 102 close-coupled to a driven machine 104, such as a generator. In other exemplary embodiments, the generator 104 may be replaced with other driven devices such as, but not limited to, a pump, a mill, or a compressor. The expansion device 102 and generator 104 may each be arranged and hermetically-sealed within a housing 106. In one exemplary embodiment, the housing 106 may be split to include an expander casing 108a for enclosing the expansion device 102 and a driven machine casing 108b or generator casing for enclosing the generator 104.

The expander casing 108a may be mechanically-attached to the generator casing 108b using mechanical fasteners, such as a series of threaded bolts 112. In other exemplary embodiments, the housing 106 may be a common, integrally-formed housing that defines or otherwise encompasses both the expander casing 108a and the generator casing 108b and hermetically-seals both the expansion device 102 and the generator 104 therein.

As illustrated, the expansion device 102 is arranged in an overhung position with respect to the generator 104, but it will be appreciated that the expansion device 102 may also be placed inboard of any accompanying shaft bearings without departing from the scope of the disclosure. In one exemplary embodiment, the expansion device 102 may be an axial-flow expander or turbine. For example, as will be described in greater detail below, the expansion device 102 may be an axial, parallel flow expander. In other exemplary embodiments, however, the expansion device 102 may be a radial-flow expander.

The expansion device 102 may include a first inlet 110a and a second inlet 110b for receiving working fluid to be expanded. As illustrated, the second inlet 110b may be circumferentially-offset from the first inlet 110a about the expander casing 108. In one exemplary embodiment, the inlets 110a,b may be circumferentially-offset from each other by about 180 degrees. In other exemplary embodiments, however, the inlets 110a,b may be circumferentially-offset more or less than 180 degrees, without departing from the scope of the disclosure. The first inlet 110a may be configured to receive a first or high temperature working fluid flow and the second inlet 110b may be configured to receive a second or low temperature working fluid flow. As suggested, the first working fluid may exhibit a temperature that generally exceeds that of the second working fluid. Although the temperatures of the first and second working fluids may be different, the respective pressures of each stream of working fluid may be substantially similar.

The term "working fluid" is not intended to limit the state or phase of the working fluid. Rather, the working fluid may be a sub critical dry gas phase, a sub critical saturated gas phase, or a supercritical gas fluid, or combinations thereof. In one exemplary embodiment, the working fluid may be water (e.g., steam). In other exemplary embodiments, the working fluid may be carbon dioxide ($CO_2$), such as super-critical carbon dioxide ($ScCO_2$). Carbon dioxide is a greenhouse friendly and neutral working fluid that offers benefits such as non-toxicity, non-flammability, easy availability, low price, and no need of recycling. The term "carbon dioxide" is not intended to be limited to a $CO_2$ of any particular type, purity, or grade. For example, in at least one exemplary embodiment industrial grade $CO_2$ may be used.

In other exemplary embodiments, the working fluid may be a binary, ternary, or other combination working fluid blend. The working fluid combination can be selected for the unique attributes possessed by the specific components of the fluid combination within heat recovery systems. One such fluid combination includes a liquid absorbent and $CO_2$. Another suitable working fluid combination may be a blend of $CO_2$ and one or more other miscible fluids or chemical compounds. In yet other exemplary embodiments, the working fluid may be a combination of $CO_2$ and propane, or $CO_2$ and ammonia, without departing from the scope of the disclosure.

After the first and second working fluid flows are expanded in the expansion device 102, the first working fluid flow is discharged via a first outlet 112a and the second working fluid flow is discharged via a second outlet 112b. Expansion of the first and second working fluid flows forces the internal components (not shown) of the generator 104 into rotational movement, thereby producing power that may be discharged from the generator via line 114 and directed to a receiving station 116. The receiving station 116 may include, but is not limited to, a transformer, a busbar, an AC-DC converter, a machine to be powered (e.g., a motor), combinations of the same, or the like.

Figure 2:
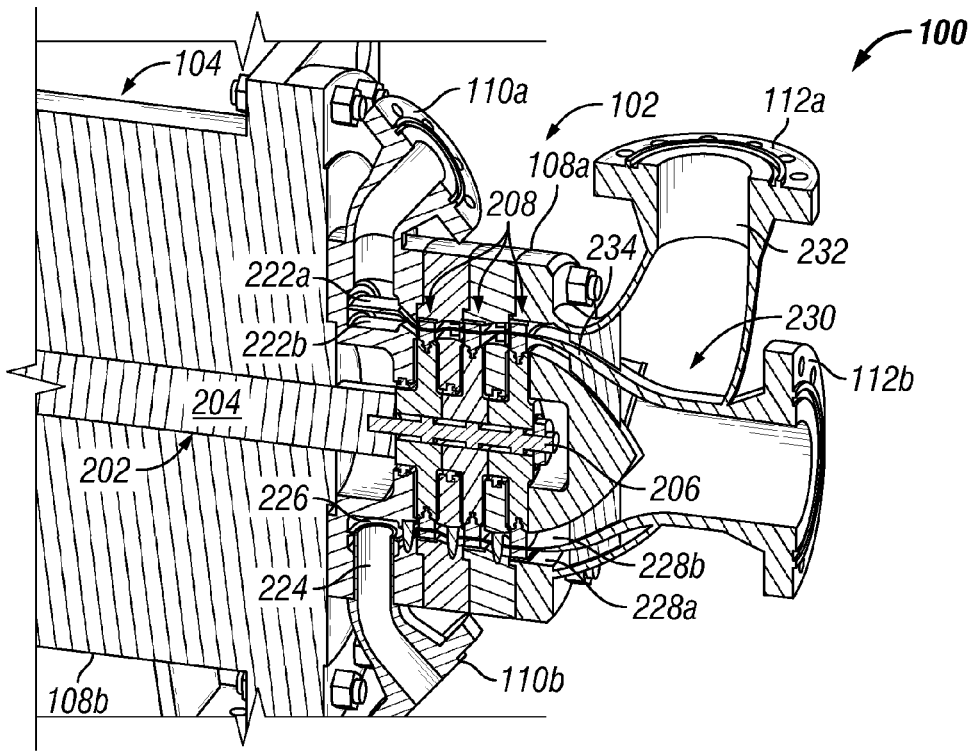
FIG. 2 illustrates a partial cross-sectional view of the exemplary rotating machine of FIG. 1.

Referring now to FIG. 2, illustrated is a partial cross-sectional view of the rotating machine 100, according to one or more exemplary embodiments described. An elongate shaft 202 is arranged for rotation within the housing 106 and extend into both the expander casing 108a and the generator casing 108b. In one exemplary embodiment, the shaft 202 may be an integral, single-piece rotor. In other exemplary embodiments, however, the shaft 202 may be divided and include a generator rotor 204 coupled or otherwise attached to an expander rotor 206. In the illustrated exemplary embodiment, the generator rotor 204 is generally arranged within the generator casing 108b and the expander rotor 206 is generally arranged within the expander casing 108a.

Although not shown, it will be appreciated that the generator rotor 204 may be supported at or near each end by one or more radial bearings, such as active or passive magnetic bearings. Moreover, one or more axial thrust bearings may also be arranged on the generator rotor 204 to moderate axial thrusts generated by expanding working fluids in the expansion device 102. The expander rotor 206 may be coupled to and, therefore, "overhung" off one end of the generator rotor 204 and extend into the expansion device 102.

Figure 3:
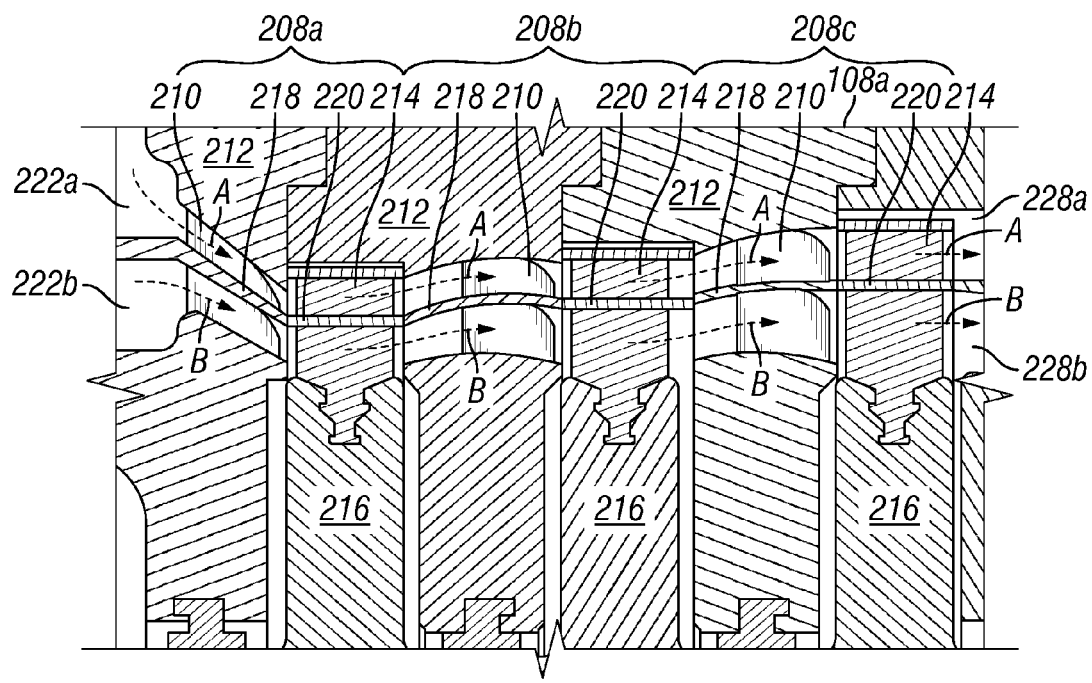
FIG. 3 illustrates a cross-sectional view of a portion of the exemplary rotating machine of FIG. 1.

The expansion device 102 may include one or more expansion stages 208 arranged axially along the expander rotor 206. Referring to FIG. 3, with continued reference to FIG. 2, illustrated are three axially-adjacent expansion stages 208, shown as first 208a, second 208b, and third 208c expansion stages. It will be appreciated, however, that any number of axially-arranged expansion stages 208 may be employed without departing from the scope of the disclosure. The illustrated exemplary embodiment assumes a low reaction flowpath design approach, but it will be appreciated that a high reaction-style implementation is also possible, without departing from the scope of the disclosure.

Each expansion stage 208a-c includes a non-rotating stator vane 210 mounted in an annular pressure containing stator 212 that is either coupled to or forms an integral part of the expander casing 108a. Each stator vane 210 may be followed axially by a rotating blade 214 mounted on the outer radial extent of a disk-shaped wheel 216. Each wheel 216, in turn, is mounted on the shaft 202 (e.g., expander rotor 206) or otherwise forms an integral part thereof. In at least one exemplary embodiment, more than one rotating blade 214 may follow each stator vane 210 in one or more of the expansion stages 208a-c in order to account for requirements of effective energy extraction.

Each expansion stage 208a-c may be divided radially into two or more parallel working fluid flowpaths, depicted in FIG. 3 as a first or outer expander flowpath A and a second or inner expander flowpath B. The parallel flowpaths A,B may be radially-separated by a series of flow stream dividers generally extending axially from the first expansion stage 208a through the third expansion stage 208c. More specifically, each expansion stage 208a-c may include a vane divider 218 followed axially and generally tangent thereto by a blade divider 220. The vane dividers 218 and the blade dividers 220 may be generally thin, annular structures superimposed on each stator vane 210 and succeeding rotating blade 214, respectively. Each divider 218, 220 may be integrally-machined or cast with its corresponding stator vane 210 or rotating blade 214. In other exemplary embodiments, however, the dividers 218, 220 may be fabricated separately and thereafter coupled to their corresponding stator vane 210 or rotating blade 214 with joining techniques known in the art, such as riveting, welding, brazing, combinations thereof, or the like.

The vane dividers 218 are generally perpendicular to the direction of flow and divide each stator vane 210 into two similar stator vane segments corresponding to the inner and outer flowpaths A, B, respectively. Likewise, the blade dividers 220 separate each rotating blade 214 into two generally identical rotating blades 214 that also correspond to the inner and outer flowpaths A,B, respectively. It will be appreciated, however, that the design parameters of each divided portion of stator vane 210 and rotating blade 214 may differ to fit varying applications. For example, each flowpath A,B may require small changes in flowstream continuity that can be accounted for through changes in the vane 210 and/or blade 214 geometry corresponding to each flowpath A,B. Moreover, the radial height of each flowpath A,B may be adjusted and dependent on the volume flowrate of each process stream being expanded.

Referring again to FIG. 2, the expansion device 102 may further define a first or outer inlet manifold 222a and a second or inner inlet manifold 222b. The inlet manifolds 222a,b may be generally annular and concentric, where the inner inlet manifold 222b is concentrically-disposed within the outer inlet manifold 222a in a nested relationship. The outer inlet manifold 222a may be fluidly coupled to the first inlet 110a and thereby configured to receive the first or high temperature working fluid flow. The inner inlet manifold 222b may be fluidly coupled to the second inlet 110b and thereby configured to receive the second or low temperature working fluid flow.

The inner inlet manifold 222b may be fluidly coupled to the second inlet 110b via a tubing segment 224 that extends through or otherwise penetrates the outer inlet manifold 222a. Accordingly, the tubing segment 224 may be characterized as a bayonet transfer tube, as known in the art, and may include one or more annular seals 226 at the location(s) where the tubing segment 224 penetrates the outer inlet manifold 222a. The annular seals 226 may include, but are not limited to, o-rings and piston rings, and may be configured to minimize cross stream leakage of working fluid between the inner and outer inlet manifolds 222a,b. Other exemplary embodiments of the disclosure include using other means of admitting the working fluids into the respective flowpaths A,B such as axially-arrayed inlet passages, or other combinations of passages at complex angles to the central axis of the expander 102.

As illustrated in FIG. 3, the outer inlet manifold 222a fluidly communicates the high temperature working fluid flow to the outer expander flowpath A. Likewise, the inner inlet manifold 222b fluidly communicates the low temperature working fluid flow to the inner expander flowpath B. As will be appreciated, it may be considered advantageous to direct the higher temperature working fluid flow to the outer expander flowpath A so that stress-critical areas, such as the wheels 216 and the expander rotor 206, are generally isolated from the highest working fluid gas temperatures.

The dividers 218, 220 arranged between each flowpath A,B may serve a dual purpose. First, the dividers 218, 220 may be adapted to maintain general thermal isolation between the flowpaths A,B. Secondly, the dividers 218, 220 may be adapted to prevent inter-stream leakage between the flowpaths A,B. As briefly discussed above, the respective pressures of the high and low temperature working fluid flows may be substantially similar such that the pressure of each working fluid flow is largely comparable at every corresponding point along the respective flowpaths A,B. Consequently, the amount of inter-stream leakage during exemplary operation will be minimal, if at all.

Nevertheless, the axial extents of each blade divider 220 may be configured to fit closely to the axially-adjacent vane dividers 218 to thereby achieve a measure of fluid sealing between the two flowpaths A,B as the rotating blades 214 revolve during operation. As illustrated, this sealing may be achieved by the close, axial spacing of the expansion stages 208*a-c*. In other exemplary embodiments, however, the outer expander flowpath A may be generally sealed from the inner expander flowpath B with some other type of radial or axial sealing method known in the art. The sealing can include radial labyrinth seals, carbon ring seals, abradable seals, brush seals, combinations thereof, or the like.

During operation, the high and low temperature working fluid flows introduced into the outer and inner flowpaths A,B, respectively, initially enter the first expansion stage 208*a* where the first stator vane 220 directs each working fluid flow into the axially-succeeding blade 214. As the high and low temperature working fluid flows contact the blade 214 in their respective flowpaths A, B, the expander rotor 206 is forced into rotational movement. The partially-expanded high and low temperature working fluid flows are then directed to the second and third expansion stages 208*b,c*, successively, and the foregoing process is repeated in each stage 208*b,c*. As the working fluid progresses through the expansion stages 208*a-c* from left to right, rotational force is continuously imparted to the expander rotor 206, and the pressure and temperature of the high and low temperature working fluid progressively decreases.

Referring again to FIG. 2, once expanded through the third and/or final expansion stage 208*c*, the first working fluid flow is exhausted into a first or outer exhaust duct 228*a* and the second working fluid flow is exhausted into a second or inner exhaust duct 228*b*. The second working fluid flow is eventually exhausted from the expansion device 102 via the second outlet 112*b* which is fluidly coupled to the inner exhaust duct 228*b*. Accordingly, the second outlet 112*b* may be a simple, axially-aligned flow collector.

The first working fluid flow coursing through the outer flowpath A is eventually exhausted from the expansion device 102 via the first outlet 112*a* which is fluidly coupled to the outer exhaust duct 228*a*. The outer exhaust duct 228*a* may be a passage or conduit that starts as an annular passage concentric with the rotational axis of the shaft 202 and aligned with the endwalls of the third or final expansion stage 208*c* in the outer flowpath A. This passage may then transition through a turn 230 (in this case 90° from axial) into a pipe nozzle 232 of appropriate flow diameter. The outer endwall 234 of the inner flowpath B may initially provide the inner surface of the outer exhaust duct 228*a* near the final expansion stage 208*c*. Both exhaust ducts 228*a,b* may be configured to have controlled area scheduling along their respective meridional lengths. In other exemplary embodiments, the exhaust ducts 228*a,b* may a utilize scroll-style topography. In yet other exemplary embodiments, one or both exhaust duct 228*a,b* may include some form or amount of diffusion for one or both of the flowpaths A,B.

The exemplary embodiments disclosed herein may provide several advantages over prior systems. For instance, the disclosure replaces two or more separate gas expanders with one slightly larger single unit. And by combining multiple expander flowpaths into one unit, all parasitic losses such as windage, mechanical, and leakage are significantly reduced. Moreover, the disclosure facilitates beneficial radial distribution of the separate expander flow streams A and B. For example, the low temperature flow stream A may be located adjacent to the rotor wheels 216 to minimize the cost and complexity of the mechanical rotor system including any required cooling systems.

Also, the use of a single unit to handle multiple expander flow streams allows for a reduction in required ancillary equipment, including sealing and bearing support modules, and driven equipment, including any required speed changing equipment. Accordingly, combining multiple expansion processes into one turbine unit substantially reduces cost and maximizes effectiveness and reliability of this type of energy conversion process.

Figure 4:
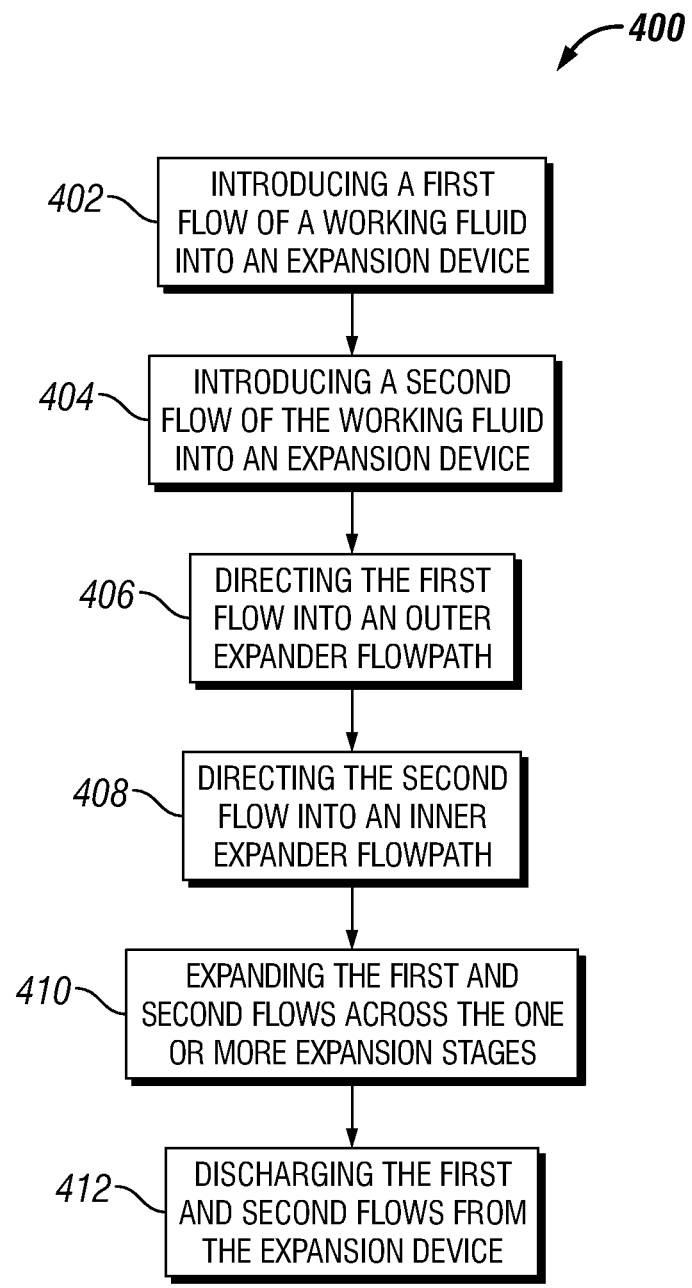
FIG. 4 is a flowchart of a method for expanding a working fluid, according to one or more exemplary embodiments disclosed.

Referring now to FIG. 4, illustrated is a flowchart of a method 400 for expanding a working fluid. The method 400 may include introducing a first flow of a working fluid into an expansion device via a first inlet, as at 402. The first flow may be at a first, high temperature. A second flow of the working fluid may be introduced into the expansion device via a second inlet, as at 404. The second flow may be at a second temperature that is lower than the first temperature.

The first flow may then be directed into an outer expander flowpath, as at 406. The outer expander flowpath may be defined axially along one or more expansion stages. The second flow may be directed into an inner expander flowpath, as at 408. The inner expander flowpath may be defined axially along the one or more expansion stages, and the inner and outer expander flowpaths may be being radially-separated by a series of flow stream dividers configured to thermally and sealingly isolate the inner expander flowpath from the outer expander flowpath. The first and second flows may then be expanded across the one or more expansion stages, as at 410. The method 400 may further include discharging the first and second flows from the expansion device, as at 412. The first flow may be discharged via a first outlet and the second flow may be discharged via a second outlet.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. An expansion device, comprising:
    an expander casing having an expander rotor rotatably arranged therein;
    a first inlet to the expander casing for receiving a first flow of a working fluid at a first temperature;
    a second inlet to the expander casing for receiving a second flow of the working fluid at a second temperature, the second temperature being less than the first temperature;
    one or more expansion stages arranged axially along the expander rotor, each expansion stage including a non-rotating stator vane followed axially by a rotating blade;
    a series of flow stream dividers extending axially along the one or more expansion stages to divide the one or more expansion stages into an outer expander flowpath and an inner expander flowpath, the outer expander flowpath being radially-offset from the inner expander flowpath;

an outer inlet manifold fluidly coupled to both the first inlet and the outer expander flowpath such that the outer expander flowpath receives the first flow of the working fluid; and an inner inlet manifold fluidly coupled to both the second inlet and the inner expander flowpath such that the inner expander flowpath receives the second flow of the working fluid, wherein the inner inlet manifold is concentrically-disposed within the outer inlet manifold in a nested relationship, and the inner inlet manifold fluidly couples the second inlet to the inner expander flowpath via a tubing segment that extends through the outer inlet manifold.

2. The expansion device of claim 1, wherein the first and second flows have a pressure that is substantially the same.

3. The expansion device of claim 1, wherein the working fluid is carbon dioxide.

4. The expansion device of claim 1, wherein each rotating blade is mounted on an outer radial extent of a disk-shaped wheel coupled to the expander rotor.

5. The expansion device of claim 1, wherein the series of flow stream dividers includes a vane divider superimposed on each stator vane and a blade divider superimposed on each rotating blade, each vane divider being followed axially and tangent thereto by a corresponding blade divider.

6. The expansion device of claim 1, further comprising:
a first outlet fluidly coupled to the outer expander flowpath for discharging the first flow of the working fluid; and
a second outlet fluidly coupled to the inner expander flowpath for discharging the second flow of the working fluid.

7. A method for expanding a working fluid, comprising:
introducing a first flow of a working fluid into an expansion device via a first inlet and an outer inlet manifold fluidly coupled thereto, the first flow being at a first temperature;
introducing a second flow of the working fluid into the expansion device via a second inlet and an inner inlet manifold fluidly coupled thereto, the second flow being at a second temperature that is lower than the first temperature;
directing the first flow into an outer expander flowpath fluidly coupled to the outer inlet manifold and defined axially along one or more expansion stages of the expansion device;
directing the second flow into an inner expander flowpath fluidly coupled to the inner inlet manifold and defined axially along the one or more expansion stages, wherein the inner and outer expander flowpaths are radially-separated by a series of flow stream dividers configured to thermally and sealingly isolate the inner expander flowpath from the outer expander flowpath, the inner inlet manifold is concentrically-disposed within the outer inlet manifold in a nested relationship, and
the inner inlet manifold fluidly couples the second inlet to the inner expander flowpath via a tubing segment that extends through the outer inlet manifold;
expanding the first and second flows across the one or more expansion stages; and
discharging the first and second flows from the expansion device via first and second outlets, respectively.

8. The method of claim 7, further comprising:
rotating an expander rotor in response to the first and second flows expanding in the one or more expansion stages;
driving a generator rotor coupled to the expander rotor, the generator rotor being configured to support a generator for rotation; and
generating electricity in the generator.

9. The method of claim 7, further comprising introducing the first and second flows into the expansion device at a substantially similar pressure.

10. The method of claim 7, wherein the working fluid is carbon dioxide.

11. A rotating machine, comprising:
an expansion device hermetically-sealed within a first casing having an expander rotor arranged therein for rotation, the expansion device comprising:
one or more expansion stages arranged axially along the expander rotor and divided radially into an outer expander flowpath and an inner expander flowpath by a series of flow stream dividers;
a first inlet fluidly coupled to the outer expander flowpath to direct a first flow of a working fluid at a first temperature to the outer expander flowpath;
a second inlet fluidly coupled to the inner expander flowpath to direct a second flow of the working fluid at a second temperature to the inner expander flowpath, the second temperature being less than the first temperature;
an outer inlet manifold fluidly coupling the first inlet to the outer expander flowpath; and
an inner inlet manifold fluidly coupling the second inlet to the inner expander flowpath, wherein the inner inlet manifold is concentrically-disposed within the outer inlet manifold in a nested relationship, and the inner inlet manifold fluidly couples the second inlet to the inner expander flowpath via a tubing segment that extends through the outer inlet manifold; and
a driven machine hermetically-sealed within a second casing coupled to the first casing, the second casing having a driven machine rotor arranged therein for rotation and coupled to the expander rotor.

12. The rotating machine of claim 11, wherein the working fluid is carbon dioxide.

13. The rotating machine of claim 11, wherein the driven machine is an electrical generator.

14. The rotating machine of claim 11, wherein the first and second casings form a single housing structure that hermetically-seals the expansion device and the driven machine therein.

15. The rotating machine of claim 11, wherein the series of flow stream dividers includes one or more vane dividers superimposed on corresponding stator vanes and one or more blade dividers superimposed on corresponding rotating blades, each vane divider being followed axially and tangent thereto by a corresponding blade divider to thermally and sealingly isolate the inner expander flowpath from the outer expander flowpath.

16. The rotating machine of claim 11, further comprising:
a first outlet fluidly coupled to the outer expander flowpath for discharging the first flow of the working fluid; and
a second outlet fluidly coupled to the inner expander flowpath for discharging the second flow of the working fluid.

* * * * *